United States Patent
Yoshida

(10) Patent No.: US 10,409,670 B2
(45) Date of Patent: Sep. 10, 2019

(54) ENCODER WITH ACCURACY CORRECTION FUNCTION

(71) Applicant: FANUC CORPORATION, Yamanashi (JP)

(72) Inventor: Hirosato Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 747 days.

(21) Appl. No.: 14/264,098

(22) Filed: Apr. 29, 2014

(65) Prior Publication Data

US 2014/0331076 A1 Nov. 6, 2014

(30) Foreign Application Priority Data

May 2, 2013 (JP) .................................. 2013-097017

(51) Int. Cl.
*G01C 17/38* (2006.01)
*G06F 11/07* (2006.01)
*G05B 19/401* (2006.01)

(52) U.S. Cl.
CPC ........ *G06F 11/0793* (2013.01); *G05B 19/401* (2013.01)

(58) Field of Classification Search
CPC ........................... G06F 11/0793; G05B 19/401
USPC ......................................................... 702/94
See application file for complete search history.

(56) References Cited

U.S. PATENT DOCUMENTS

| | | | | |
|---|---|---|---|---|
| 4,779,216 A | * | 10/1988 | Collins | ..................... G01J 3/28 250/252.1 |
| 6,956,505 B2 | * | 10/2005 | Taniguchi | ........... H03M 1/1038 341/11 |
| 7,496,462 B2 | * | 2/2009 | Murokita | ........... G01D 5/24452 341/111 |
| 2002/0082786 A1 | * | 6/2002 | Mallory | .................. G01H 3/08 702/75 |
| 2003/0001564 A1 | | 1/2003 | Hayashi | |
| 2003/0160160 A1 | | 8/2003 | Taniguchi et al. | |

(Continued)

FOREIGN PATENT DOCUMENTS

| | | |
|---|---|---|
| CN | 1038359 A | 12/1989 |
| CN | 101044374 A | 9/2007 |

(Continued)

OTHER PUBLICATIONS

English translation of JP 2003-254785, Sep. 10, 2003.*

(Continued)

*Primary Examiner* — Michael P Nghiem
(74) *Attorney, Agent, or Firm* — Fredrikson & Byron, P.A.

(57) ABSTRACT

An encoder (1) having a body to be measured (30) and a measuring body (10) includes an analog-digital converter (21) converting, to a digital signal, a sinusoidal analog signal generated by a detection unit (11) and has different phases, a storage unit (22) storing correction data for aperiodic error components among periodic and aperiodic error components included in errors of position data, an aperiodic error correction unit (23) correcting the aperiodic error components among errors in the position data by using the correction data, and a periodic error correction unit (24) correcting the periodic error components among the errors in the position data.

7 Claims, 4 Drawing Sheets

(56) References Cited

U.S. PATENT DOCUMENTS

| | | | |
|---|---|---|---|
| 2004/0153780 A1* | 8/2004 | Strohrmann | F02D 41/18 714/25 |
| 2005/0162571 A1* | 7/2005 | Marshall | H04N 9/3114 348/743 |
| 2006/0136169 A1 | 6/2006 | Shonai et al. | |
| 2008/0200203 A1* | 8/2008 | Malladi | H04W 52/287 455/522 |
| 2008/0228423 A1 | 9/2008 | Hayashi | |
| 2008/0319713 A1* | 12/2008 | Resende | G06F 7/544 702/189 |
| 2009/0021246 A1 | 1/2009 | Uehira et al. | |
| 2009/0221246 A1 | 1/2009 | Uehira et al. | |
| 2009/0259918 A1* | 10/2009 | Sugie | G01D 5/24409 714/764 |
| 2009/0326860 A1* | 12/2009 | Hainz | G01D 5/24452 702/163 |
| 2010/0176975 A1 | 7/2010 | Nakazato et al. | |
| 2011/0320154 A1 | 12/2011 | Wakizaka et al. | |

FOREIGN PATENT DOCUMENTS

| | | |
|---|---|---|
| CN | 101894570 A | 11/2010 |
| CN | 102435215 A | 5/2012 |
| DE | 19502399 C2 | 4/1998 |
| DE | 10041096 A1 | 3/2002 |
| DE | 102008043556 A1 | 5/2010 |
| DE | 102009031736 A1 | 1/2011 |
| EP | 1804032 A1 | 7/2007 |
| EP | 1923670 A1 | 5/2008 |
| JP | 60-170456 * | 9/1985 |
| JP | 4320901 A | 11/1992 |
| JP | 09042995 * | 2/1997 |
| JP | 10311741 A | 11/1998 |
| JP | 11-065625 A | 9/1999 |
| JP | 2003254785 A | 9/2003 |
| JP | 2006170790 A | 6/2006 |
| JP | 2006177718 A | 7/2006 |
| JP | 2006184024 A | 7/2006 |
| JP | 2006234723 A | 9/2006 |
| JP | 2007064771 A | 3/2007 |
| JP | 2009174863 A | 8/2009 |
| JP | 2011141247 A | 7/2011 |
| WO | 2006043403 A1 | 4/2006 |
| WO | 2007060840 A1 | 5/2007 |

OTHER PUBLICATIONS

English Abstract and Machine Translation for German Publication No. 19502399 C2, published Oct. 19, 1995, 17 pgs.
English Abstract and Machine Translation for German Publication No. 10041096 A1, published Mar. 7, 2002, 8 pgs.
English Abstract and Machine Translation for European Publication No. 1923670 A1, published May 21, 2008, 11 pgs.
English Abstract and Machine Translation for German Publication No. 102008043556 A1, published May 12, 2010, 15 pgs.
English Abstract and Machine Translation for German Publication No. 102009031736 A1, published Jan. 13, 2011, 12 pgs.
English Abstract and Machine Translation for Japanese Publication No. 11-65625 A, published Mar. 9, 1999, 10 pgs.
English Machine Translation for Japanese Publication No. 2006-177718 published Jul. 6, 2006, 6 pgs.
English Machine Translation for Japanese Publication No. 2006-184024 published Jul. 13, 2006, 11 pgs.
English Abstract for Japanese Publication No. 4-320901 published Nov. 11, 1992, 1 pg.
English Machine Translation for Japanese Publication No. 2009-174863 published Aug. 6, 2009, 11 pgs.

* cited by examiner

ENCODER WITH ACCURACY CORRECTION FUNCTION

BACKGROUND OF THE INVENTION

1. Field of the Invention

The present invention relates to an encoder that detects a linear motion position of a body to be measured or a rotation angle of a body to be measured and includes an accuracy correction function.

2. Description of the Related Art

A machine tool includes a table that linearly moves a workpiece or the like and a motor that drives the table. The machine tool is equipped with an encoder that detects the linear motion position of the table or the rotation angle of the motor, for example, a linear scale and a rotary encoder.

A measuring body such as the linear scale or the rotary encoder periodically generates an analog signal in accordance with movement of a body to be measured such as the table or the motor. Then, correction data is calculated based on a deviation between position data obtained from the analog signal and a reference value (data indicating a true position). The correction data is generated and stored in a storage unit of a signal processing unit of the measuring body beforehand. The correction data includes both of periodic and aperiodic error components.

When the machine tool is actuated, the correction data is applied to position data obtained from the analog signal related to the body to be measured to correct the linear motion position or the rotation angle of the body to be measured. Japanese Laid-open Patent Publications No. 2006-170790, No. 2011-141247, No. 2006-234723 and No. 2007-64771 disclose encoders that correct position data in this way.

However, the amount of correction data calculated beforehand as described above is large and requires a large space for the storage unit of the signal processing unit. This has led to an increase in the chip size of a signal processing unit including the storage unit, resulting in an increase in the dimensions of the measuring body.

To cope with the problem, Japanese Laid-open Patent Publications No. 10-311741 and No. 2003-254785 describe use averaging or calculating a position index on the basis of time variations to automatically correct the analog signal when using an encoder.

However, the signal processing unit of the encoder described above corrects errors caused by an offset voltage, amplitude difference and phase difference of sinusoidal analog signal. Therefore, there is a problem that aperiodic error components generated at aperiodic interval in all positional data are unable to be corrected.

The present invention has been made in light of these circumstances and an object of the present invention is to provide an encoder capable of correcting aperiodic error components without increasing the capacity of a storage unit.

SUMMARY OF THE INVENTION

To achieve the object stated above, according to a first aspect, there is provided an encoder including a body to be measured and a measuring body, wherein the measuring body includes a detection unit detecting the movement amount of the body to be measured, and a signal processing unit obtaining position data from an analog signal of the body to be measured that are generated by the detection unit, and the signal processing unit includes an analog-digital converter converting, to a digital signal, a sinusoidal analog signal that is generated by the detection unit and has a plurality of different phases, a storage unit storing correction data for aperiodic error components among periodic error components and the aperiodic error components included in errors in the position data, an aperiodic error correction unit correcting the aperiodic error components among errors in the position data by using the correction data stored in the storage unit, and a periodic error correction unit correcting periodic error components among the errors in the position data.

According to a second aspect, the correction data stored in the storage unit in the first aspect includes identification information identifying the body to be measured.

According to a third aspect, the encoder in the first or second aspect further includes an input and output unit which is connected to the storage unit and allows the correction data to be input from and output to the outside of the measuring body.

According to a fourth aspect, the body to be measured in any one of the first to third aspects is a ring element made of a magnetic material and has periodic concavo-convex parts formed on a rim of the ring element. These and other objects, features, and advantages of the present invention will further be apparent from the detailed description of typical embodiments of the present invention illustrated in the accompanying drawings.

DETAILED DESCRIPTION

Figure 1:
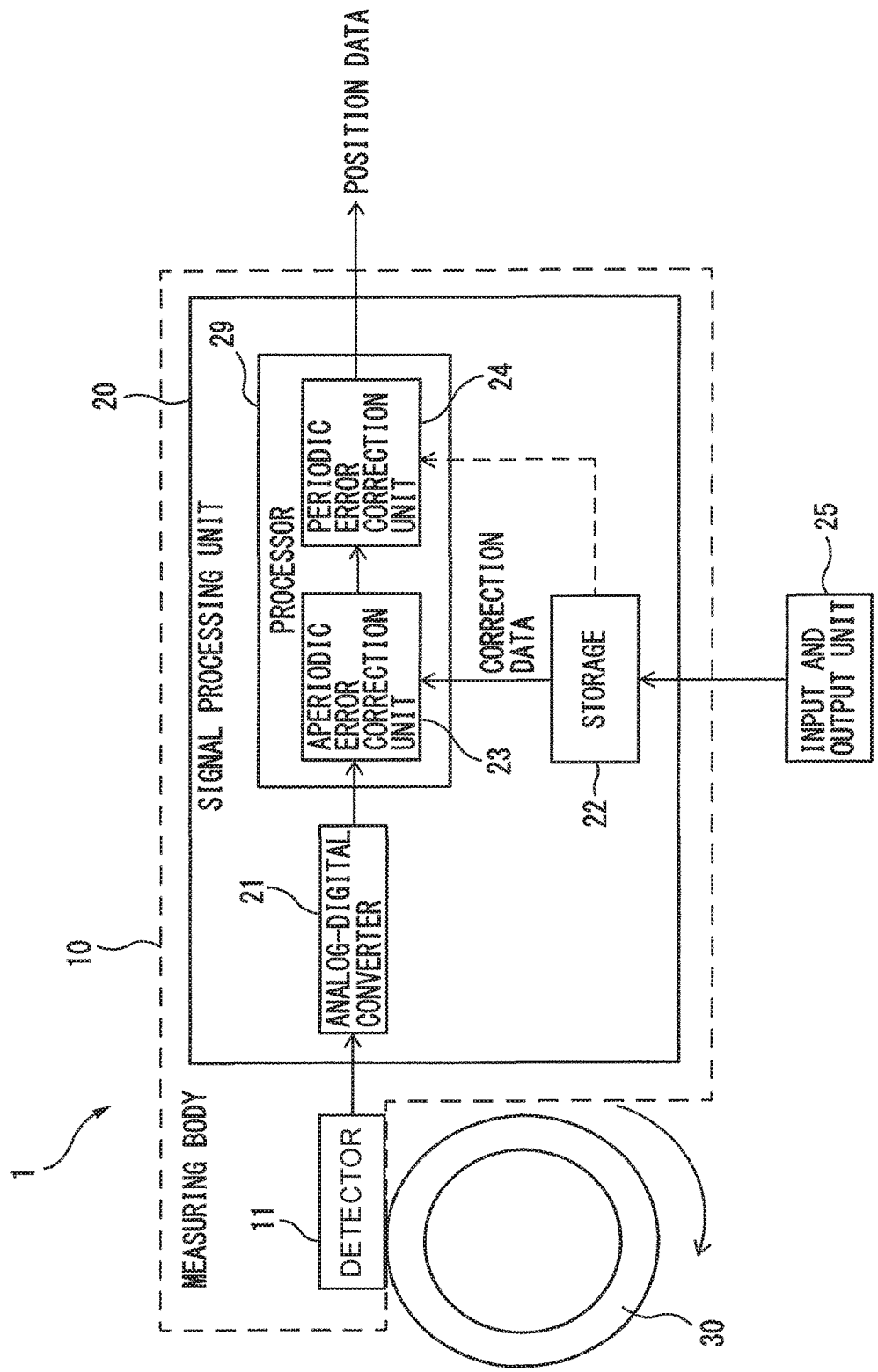
FIG. 1 is a block diagram of an encoder according to a first embodiment of the present invention.

Embodiments of the present invention will be described below with reference to the accompanying drawings. Corresponding elements are given like reference numerals throughout the drawings. For the sake of facilitating understanding, scales of the drawings are appropriately modified.

FIG. 1 is a block diagram of an encoder according to a first embodiment of the present invention. The encoder 1 in FIG. 1 includes a measuring body 10 and a body to be measured 30. The measuring body 10 principally includes a detection unit 11 disposed adjacent to the body to be measured 30 for detecting the movement amount of the body to be measured 30, and a signal processing unit 20 for obtaining position data from an analog signal of the body to be measured 30 generated by the detection unit 11.

The signal processing unit 20 converts, to a digital signal, a sinusoidal analog signal that is periodically generated by the detection unit 11 of the measuring body 10 in accordance with movement of the body to be measured 30 and has two phases with phase shift of 90 degrees and processes the signal to obtain position data of the body to be measured 30. The encoder 1 in FIG. 1 is a rotary encoder including a ring body to be measured 30. However, the encoder 1 may be a linear scale.

As illustrated in FIG. 1, the signal processing unit 20 includes an analog-digital converter 21 that converts, to a digital signal, a sinusoidal analog signal that is multiphase with different phases, generated by the detection unit 11, and a storage unit 22 such as a non-volatile memory, that stores correction data for aperiodic error components among periodic and aperiodic error components included in errors in position data.

The signal processing unit 20 further includes a processor 29 which takes an input of the digital signal resulting from conversion by the analog-digital converter 21. As can be seen from FIG. 1, the processor 29 includes an aperiodic error correction unit 23 which uses correction data for aperiodic error components stored in the storage unit 22 to correct aperiodic error components among errors in position data, and a periodic error correction unit 24 which corrects periodic error components among the errors in the position data.

Figure 2:
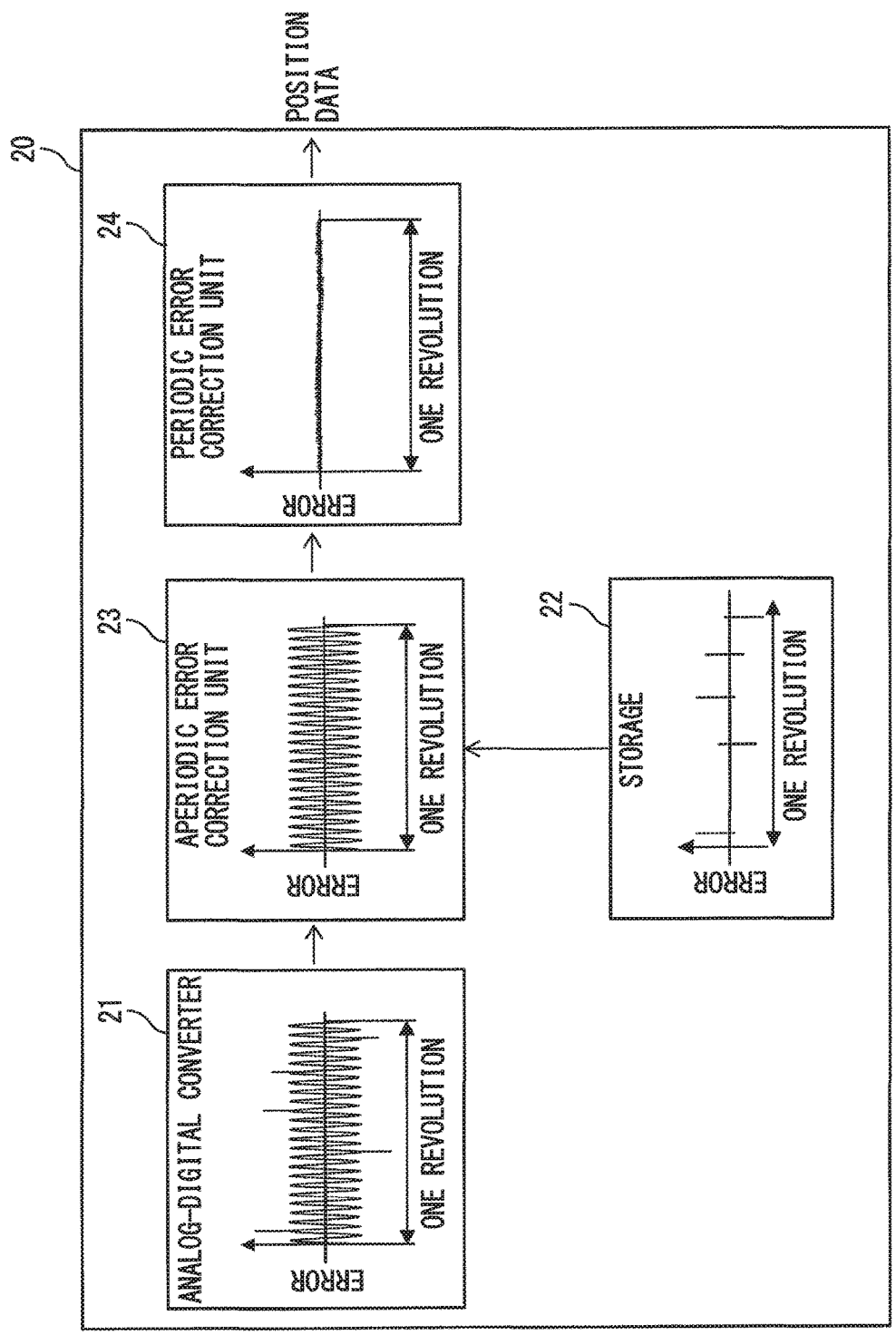
FIG. 2 is a diagram illustrating a process for correcting position data performed in a signal processing unit.

FIG. 2 is a diagram illustrating a process for correcting position data performed in the signal processing unit. First, an analog signal of the body to be measured generated by the detection unit 11 is input to the analog-digital converter 21 of the signal processing unit 20. The analog-digital converter 21 converts the analog signal to a digital signal. A waveform of position data of the digital signal resulting from the conversion is illustrated in the analog-digital converter 21 in FIG. 2. The horizontal axis of the position data represents one revolution of the body to be measured 30 and the vertical axis represents the magnitude of error as with the other graphs described below. The position data illustrated in the analog-digital converter 21 in FIG. 2 includes both of periodic and aperiodic error components.

The position data is then input from the analog-digital converter 21 into the aperiodic error correction unit 23. The aperiodic error correction unit 23 retrieves correction data from the storage unit 22 in order to correct the position data.

A waveform of correction data is illustrated in the storage unit 22 in FIG. 2. As can be seen from FIG. 2, the correction data includes only aperiodic error components. It is preferable for the correction data to use aperiodic error components included in position data after an error correction only for periodic error components without correcting aperiodic error components, in the encoder 1. Alternatively, aperiodic error components caused by factors other than an offset voltage, an amplitude difference, and a phase difference may be calculated through FFT (fast Fourier transform) or averaging, and may be used as the correction data. The correction data may be determined beforehand by experiment or the like.

Then, the aperiodic error correction unit 23 applies the correction data to the position data provided from the analog-digital converter 21. This eliminates only the aperiodic error components from the original position data and makes it possible to obtain position data as illustrated in the aperiodic error correction unit 23 in FIG. 2. Thus, the errors in the position data include only periodic error components.

The position data is then input from the aperiodic error correction unit 23 into the periodic error correction unit 24. In the periodic error correction unit 24, the periodic error components are eliminated by using a given method. As a result, position data that does not include both of periodic and aperiodic error components as illustrated in the periodic error correction unit 24 in FIG. 2 is obtained.

In this way, in the embodiment of the present invention, only aperiodic error components among the periodic and aperiodic error components included in the original position data are stored in the storage unit 22 as correction data. Accordingly, the capacity of the storage unit 22 can be kept small according to the embodiment of the present invention as compared with conventional techniques that use correction data including both of periodic and aperiodic error components. Consequently, an increase in the chip size of the signal processing unit 20 including the storage unit 22 can be prevented and the size of the measuring body 10 can be reduced.

Note that any of the various methods can be used to correct periodic error components. For example, methods described in Japanese Laid-open Patent Publications No. 10-311741 and No. 2003-254785 can be used. Alternatively, periodic error components may be separately stored in the storage unit 22 as another set of correction data and may be used in the periodic error correction unit 24 (refer to the dashed line in FIG. 1).

Figure 3:
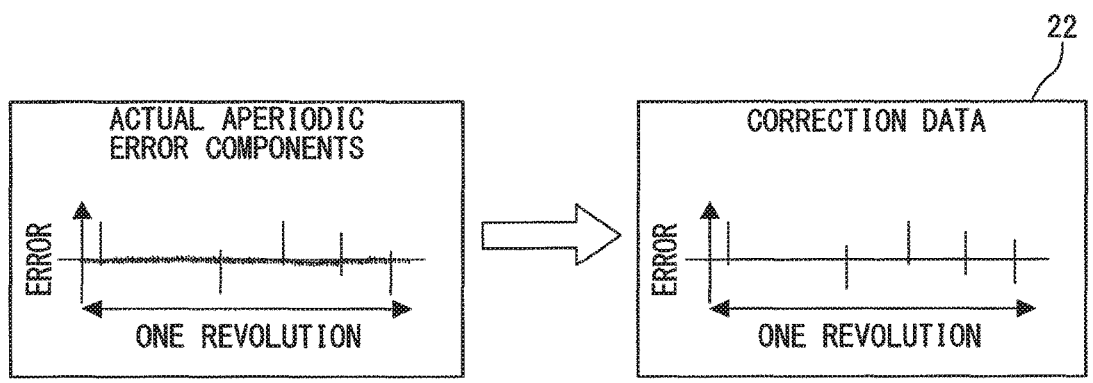
FIG. 3 is another diagram illustrating correction data.

It is desirable that the amount of correction data stored in the storage unit 22 be as small as possible in order to further reduce the capacity of the storage unit 22. FIG. 3 is another diagram illustrating correction data. As described above, the correction data uses aperiodic error components included in position data after an error correction only for periodic error components without correcting aperiodic error components, in the encoder 1. The correction data generated in this way include many error components with small error amount as illustrated in the left-hand part of FIG. 3.

According to the embodiment of the present invention, it is preferable to eliminate the error components with error amount smaller than a predetermined value. In other words, correction data is generated from only the error components with error amount equal to or greater than the predetermined value. The correction data generated in this way is illustrated in the right-hand part of FIG. 3. The correction data illustrated in the right-hand part of FIG. 3 can be represented in the form of a function, for example, $Er(n,h,w)$, where n represents the position of an error, h represents the error amount, and w represents the width of the error. It will be appreciated that this can represent correction data in very simple form and can significantly reduce the capacity of the storage unit 22. Note that the same method may be used for periodic error components when the periodic error components are separately stored in the storage unit 22 as another set of correction data.

In FIG. 1, the correction data stored in the storage unit 22 is directly input into the aperiodic error correction unit 23. However, the correction data stored in the storage unit 22 may be input into the aperiodic error correction unit 23 through a microcomputer or a volatile memory, which is not depicted, and then the position data is corrected.

Figure 4:
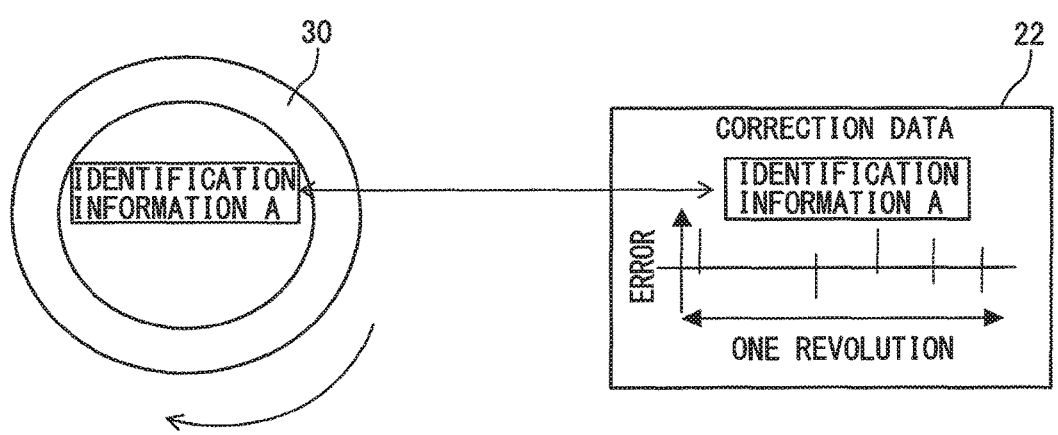
FIG. 4 is a diagram illustrating correction data including identification information.

FIG. 4 is a diagram illustrating correction data including identification information. To facilitate understanding, elements other than the body to be measured 30 and the storage unit 22 are omitted in FIG. 4. As illustrated in the left-hand part of FIG. 4, the body to be measured 30 includes identification information A for identifying the body to be measured 30. The identification information A may be the model number or lot number of the body to be measured 30. Such identification information A may be presented by a barcode or a QR code (registered trademark).

According to the embodiment of the present invention, correction data stored in the storage unit 22 is correction data relating to aperiodic error components specific to the body to be measured 30 that has been generated using the body to be measured 30 including the identification information A. In other words, the identification information A is added to correction data stored in the storage unit 22 as illustrated in the right-hand part of FIG. 4.

In this case, the correction data to which the identification information A is added can be recorded in another storage device or a database. When the measuring body 10 is replaced, correction data associated with an already shipped body to be measured 30 including the identification information A may be stored in the storage 22 of a new measuring body 10. In this way, a measuring body 10 for use with an already shipped body to be measured 30 can be readily prepared.

Likewise, pieces of correction data to which pieces of identification information A, B, C, . . . relating to a plurality of types of bodies to be measured 30 are added may be generated beforehand. When a body to be measured 30 is damaged, the body to be measured 30 is replaced with another body to be measured 30. The correction data, to which identification information associated with the another body to be measured 30, for example, identification information B is added, may be stored in the storage unit 22 of the measuring body 10. Alternatively, pieces of correction data to which such pieces of identification information A, B, C, . . . are added may be stored in the storage unit 22 beforehand, and the piece of correction data with the identification information B associated with the another body to be measured 30 may be simply retrieved.

Thus, when either the body to be measured 30 or the measuring body 10 is damaged, the damaged body to be measured 30 or damaged measuring body 10 can be replaced separately in the embodiment of the present invention. Therefore, it is convenient and economically advantageous.

Referring back to FIG. 1, an input and output unit 25 is connected to the signal processing unit 20. The input and output unit 25 may be a keyboard or a mouse connected through a USB, for example. Alternatively, the input and output unit 25 may be another computer connected through a LAN or the like.

When the encoder 1 is connected to another computer that serves as the input and output unit 25, correction data for aperiodic error components do not need to be calculated in the encoder 1. Accordingly, the signal processing unit 20 can be simplified and consequently the encoder 1 can be produced at low cost. Furthermore, it is understood that correction data can be readily retrieved and written when maintenance on the encoder 1 is performed.

Figure 5:
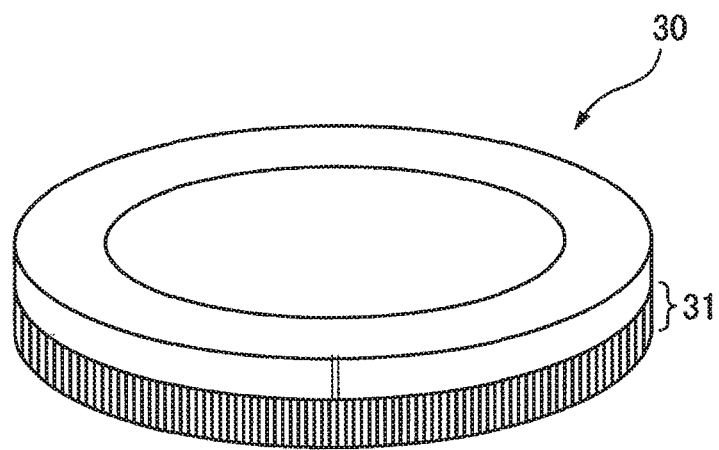
FIG. 5 is a perspective view of a body to be measured in an embodiment.

FIG. 5 is a perspective view of a body to be measured in an embodiment. The body to be measured 30 is a ring element made of a magnetic material such as iron. As illustrated in FIG. 5, plurality of evenly spaced concavo-convex parts 31 are formed at the rim of the body to be measured 30. The concavo-convex parts 31 are preferably formed by gear machining.

Typically, gear machining is accomplished by cutting or grinding with a tool. However, machining errors can occur in every concavo-convex parts 31 due to vibration during gear machining or wear of the tool. Such machining errors can generate aperiodic error components.

In other words, when the body to be measured 30 illustrated in FIG. 5 is used, position data tends to include aperiodic error components. Therefore, the embodiment of the present invention, which eliminates aperiodic error components as described above, is advantageous especially when using a body to be measured 30 that tends to generate aperiodic error components.

ADVANTAGEOUS EFFECTS OF THE INVENTION

In the first aspect, only aperiodic error components among the periodic and aperiodic error components included in position data are stored in the storage unit as correction data. Accordingly, the capacity of the storage can be saved. Thus, aperiodic error components can be corrected without increasing the capacity of the storage unit.

In the second aspect, a measuring body in which correction data associated with an already shipped body to be measured is stored can be readily prepared when replacing the measuring body, since correction data includes identification information. Furthermore, when either the body to be measured or the measuring body is damaged, the damaged body to be measured or damaged measuring body can be separately replaced, which is convenient and economically advantageous.

In the third aspect, the provision of the input and output unit eliminates the need for calculating correction data for aperiodic error components in the encoder. Accordingly, the signal processing unit can be simplified and consequently the encoder can be produced at low cost. Furthermore, when maintenance on the encoder is performed, correction data can be readily retrieved and written.

When periodic concavo-convex parts are formed at the rim of a ring element, machining errors can occur due to vibration or wear of a tool during the formation of the concavo-convex parts, and aperiodic error components due to the machining errors tend to be generated. The fourth aspect is advantageous especially when such aperiodic error components are likely to appear.

While the present invention has been described with typical embodiments, it will be understood by those skilled in the art that modifications described above and various other modifications, omissions and additions can be made without departing from the scope of the present invention.

What is claimed is:

1. An encoder including a body to be measured and a measuring body, the measuring body comprising:
   a detector to:
   detect a movement amount of the body to be measured; and
   generate an analog signal representative thereof, the analog signal having an error comprising periodic error components and aperiodic error components, the periodic error components have a periodicity within one rotation of the body to be measured and the aperiodic error components have no periodicity within the one rotation of the body to be measured; and
   a signal processor comprising:
   an analog-digital converter to digitize the analog signal to a digital signal, the digital signal having:
   digitized values of signals representative of a position of the body to be measured,
   digitized values of the periodic error components, and
   digitized values of the aperiodic error components;
   a storage to only store correction data for the digitized value of the aperiodic error components, the correction data being a result of previously-obtained digitized aperiodic error components after noise components are removed,
   a first processor to receive the correction data from the storage and apply the correction data to the digital signal to remove the digitized value of the aperiodic error components from the digital signal, to generate a first signal; and
   a second processor to calculate correction data for the periodic error components including an amplitude offset, and apply the calculated correction data for the periodic error components to the first signal to remove the periodic error components from the first signal to generate position data, wherein the position data represents the position of the body.

2. The encoder according to claim 1, further comprising an input and output unit connected to the storage and allowing the correction data for the digitized value of the aperiodic error components to be input from and output to the outside of the measuring body.

3. The encoder according to claim 2, wherein the body to be measured is a ring element made of a magnetic material, the ring element having periodic concavo-convex parts formed on a rim of the ring element.

4. The encoder according to claim 1, further comprising an input and output unit connected to the storage and allowing the correction data for the digitized value of the aperiodic error components to be input from and output to the outside of the measuring body.

5. The encoder according to claim 4, wherein the body to be measured is a ring element made of a magnetic material, the ring element having periodic concavo-convex parts formed on a rim of the ring element.

6. The encoder according to claim 1, wherein the body to be measured is a ring element made of a magnetic material, the ring element having periodic concavo-convex parts formed on a rim of the ring element.

7. The encoder according to claim 1, wherein the body to be measured is a ring element made of a magnetic material, the ring element having periodic concavo-convex parts formed on a rim of the ring element.

* * * * *